INVENTORS.
Robert C. Keller, &
BY Walter K. Fuelberth
a. M. Heiter
ATTORNEY

April 28, 1970  R. C. KELLER ET AL  3,508,630
LUBRICATING MEANS FOR A TRANSMISSION Filed Oct. 24, 1968  2 Sheets-Sheet 2

INVENTORS.
Robert C. Keller, &
BY Walter K. Fuelberth a. M. Heiter
ATTORNEY

United States Patent Office 3,508,630
Patented Apr. 28, 1970

3,508,630
LUBRICATING MEANS FOR A TRANSMISSION
Robert C. Keller, Troy, and Walter K. Fuelberth, Warren, Mich., assignors to General Motors Corporation, Detroit, Mich., a corporation of Delaware
Filed Oct. 24, 1968, Ser. No. 770,287
Int. Cl. F01m 9/06; F16n 7/26
U.S. Cl. 184—11                                    3 Claims

ABSTRACT OF THE DISCLOSURE

A lubricating means for bearings such as are found in a sliding mesh transmission gear assembly having an oil reservoir therein, wherein a pump is formed partially on the face of one of the gears and partially on a closely adjacent wall of the transmission casing, in the vicinity of a bearing mounted in a cavity formed in the wall. The pump includes an annular recess formed on the closely adjacent face of the gear and having radial fins incorporated in the recess to form a plurality of annularly aligned pockets on the face. Inlet and outlet troughs or grooves are formed on the adjacent wall, spaced apart from one another adjacent the annularly aligned pockets, the pockets serving to transport oil from the inlet trough to the outlet trough. A passageway then communicates from the outlet trough past the outer periphery of the bearing to the bearing cavity. It is by this means that oil which has been splashed onto the top wall of the casing and which flows down the side walls thereof is directed to the remotely located bearing. Additionally, one or more pins are mounted on the outer face of the gear a predetermined radial distance away from slots which communicate oil through the gear hub to the gear's central bearing, the pins serving to throw oil radially inward during each revolution to enter the slots and bearing.

---

This invention relates to novel lubricating means for bearings and particularly a simple modification of normal gear transmission parts to provide force feed lubrication for gear transmission bearings.

The lubrication of transmission gears and bearing members in motor vehicle transmission is partially provided for by having the gears rotated within the lubricant contained in the sump or reservoir located in the bottom of the transmission casing. While the resultant splash-feed distribution of the lubricant generally supplies sufficient lubricant to the various gears which are located within the confines of the transmission housing, the central bearings of one or more of the gears, and the bearing which supports the output shaft and which is mounted in a wall of the housing adjacent the reservoir, are very often not properly lubricated by this method.

Positive type pumps, usually of the rotary gear type, have been used to provide a forced lubrication system, supplementing the conventional splash-feed lubrication system. Such a pump is difficult to locate within the transmission housing, where space is at a premium, and adds substantially to the overall cost of manufacturing.

Accordingly, a primary object of this invention is to provide a novel, inherent means for lubricating the central bearing of a speed output gear and the bearing mounted in a wall of the housing or casing, which rotatably supports the output shaft.

Another object of the invention is to provide improved force feed lubrication means which does not require any additional space for the addition of parts therein.

A further object of the invention is to provide improved force feed lubrication means wherein the outer face of a gear includes a plurality of annularly aligned pockets, and the adjacent wall of the transmission casing has cooperating lubricant inlet grooves, an intermediate guide surface to guide lubricant into said pockets and outlet grooves therein and an outlet passage to permit the flow of lubricant to a bearing.

Still another object of the invention is to provide improved force feed lubrication means wherein one or more pins are inserted in the face of a gear concentrically aligned with circumferentially extending oil slots formed in the gear hub adjacent the face of the gear to force feed oil into the gear's central bearing.

Other objects and advantages of the invention will become more apparent when reference is made to the following specification and accompanying drawings wherein.

Figures 1, 2:
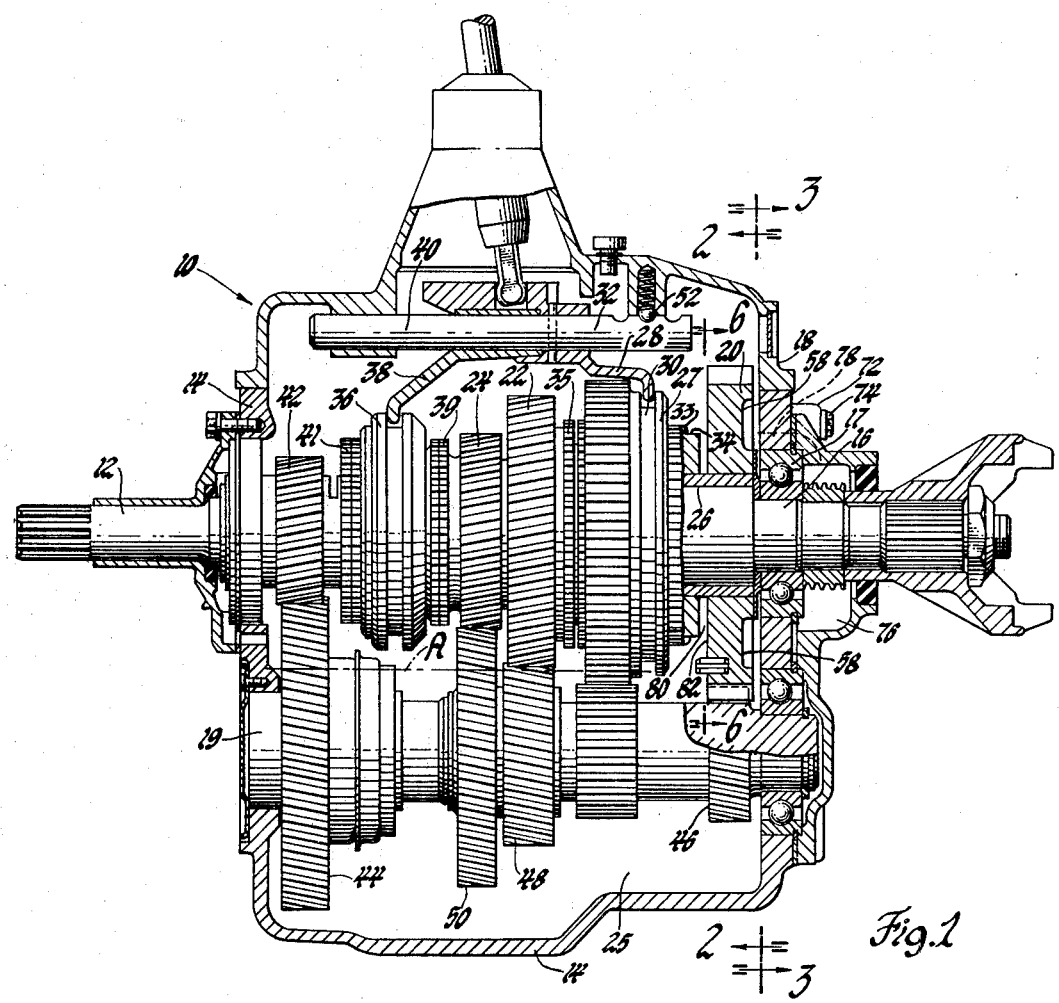
FIGURE 1 is a plan view in partial cross section illustrating a transmission embodying the invention.
FIGURE 2 is a cross-sectional view taken along the plane of line 2—2 of FIGURE 1, and looking in the direction of the arrows.

Referring now to the drawings in greater detail, FIGURE 1 illustrates a motor vehicle transmission 10 in which the sliding mesh gear assembly thereof embodies the invention. The transmission gearbox houses an input shaft 12 which is rotatably supported by the gearbox casing 14, and an output shaft 16 which is coaxial with the input shaft 12 and is journaled at its left hand end by way of roller bearings (not shown) mounted in a bore of the input shaft 12 in the conventional manner. The output shaft 16 is rotably supported adjacent its right hand end by means of a bearing 17 mounted in the rear wall 18 of the gearbox casing 14. A countershaft 19 is retatably supported at both ends by the gearbox casing 14, and has its axis of rotation parallel to the axis of rotation of the output shaft 16.

First, second and third speed gearwheels 20, 22 and 24 of successively decreasing diameters are rotatably mounted at space intervals on bearings or journals along the output shaft 16 in the casing 14 which contains oil for lubricating purposes and serves as an oil reserveroir 25 therefor. The central bearing for the first speed gearwheel 20 is located on the output shaft 16 at 26; the other similar gearwheel bearings are not shown. A shifting sleeve 27 provided with internal axial teeth (not shown) is slidable in the manner of a clutch sleeve along external splines (not shown) formed on the output shaft 16 by means of a selector fork 28, which, in the conventional manner, engages the walls of an annular groove 30 formed on the sleeve 27 and is slidable by means of a selector fork rod 32. Axial movement of the selector fork rod 32 to the right brings the internal teeth of the sleeve 27 into engagement with the external dog teeth 33 disposed on a hub or collar 34 of the first speed gearwheel 20, thereby coupling the first speed gearwheel 20 to the output shaft 16 in the known manner. Movement of the selector fork rod 32 to the left brings the internal teeth into engagement with dog teeth 35 formed on the second speed gearwheel 22 to couple the second speed gearwheel 22 to the output shaft 16 for engagement of second gear.

A second sleeve 36 mounted on a further set of splines (not shown) formed on a hub fixed to the output shaft 16 is slidable to the right by means of a selector fork 38 and selector fork rod 40 to engage dog teeth 39 formed on the third speed gearwheel 24 to couple the third speed gearwheel 24 to the output shaft 16 for engagement of third gear. Movement of the selector fork 38 to the left by means of the selector fork rod 40 causes the sleeve 36 to engage external dog teeth 41 formed on the input shaft 12 and thereby establish direct drive from the input shaft 12 to the output shaft 16 for fourth gear.

The input shaft 12 drives the counter shaft 19 in a conventional manner by means of head gears consisting of a gear 42 mounted on the input shaft 12 which meshes with a gear 44 mounted on the countershaft 19 to cause rotation of the countershaft 19 whenever the input shaft 12 is being rotated. The countershaft 19 is in a conventional manner formed with gears 46, 48 and 50, which are in constant mesh with, respectively, the first speed gearwheel 20, the second speed gearwheel 22, and the third speed gearwheel 24, whereby these three gearwheels are maintained in constant rotation, but at different speeds, wherenever the input shaft 12 is being rotated.

Thus any of the four forward gears may be engaged by appropriate movement of one or the other of the selector fork rods 32 and 40. Simultaneous movement of the rods is prevented by means of a conventional ball interlock device, and the rods are held by a detent 52.

As illustrated in FIGURE 2, the first speed output gear 20 has an annular recess 54 formed on its face adjacent the end wall 18 of the gearbox casing 14 beyond the outer periphery of the bearing 17. A plurality of radial fins 56 are formed at equal spaces in the annular recess 54, forming a plurality of pockets 58 in an annular arrangement or series.

Figure 3:
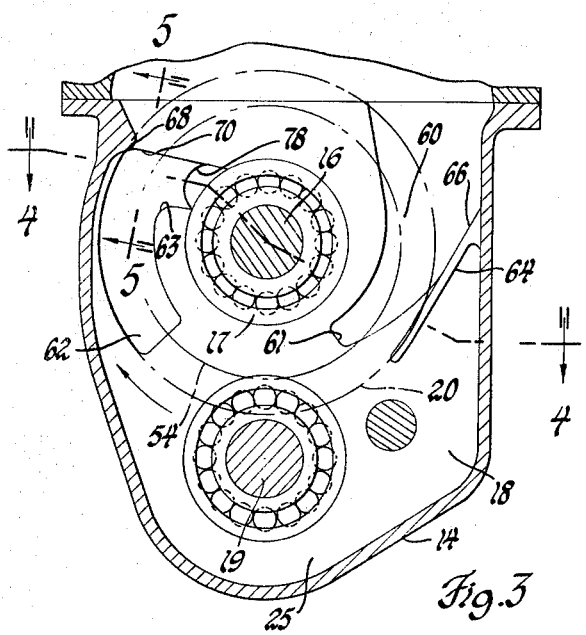
FIGURE 3 is a cross-sectional view taken along the plane of line 3—3 of FIGURE 1, and looking in the direction of the arrows.

As illustrated in FIGURE 3, inlet and outlet troughs 60 and 62 are formed in the interior wall of the gearbox casing 14. The inlet trough 60 has a large area in the upper portion of the wall 18 beyond the perimeter of gear 20 for the collection of oil and a long entry zone between the wall 18 and the gear 20 at the perimeter of the gear so a large volume of oil can flow by gravity down the trough 60 and between the gear 20 and the wall 18. The trough is directed tangentially inwardly and has a closed terminal section 61 substantially axially aligned with and facing the annular series of pockets 58 in the adjacent gear face so the oil flowing down the trough due to gravity and the pumping action enters the pockets 58 which are moving at high speed. As illustrated in FIGURE 3, the closed terminal section 61 is preferably located adjacent the outer portion of the space between the inner and outer perimeters of the annular series of pockets 58 in view of the fact that the oil is thrown outwardly under the action of centrifugal force and, hence, tends to accumulate in the outer portion of the pockets 58. The intermediate guide surface of the rear wall between the inlet and outlet troughs 60 and 62, respectively, has a close clearance adjacent the annular aligned pockets 58 formed on the face of the first speed gear 20.

The outlet trough 62 is arcuate at its outer and inner edges, the outermost edge thereof conforming with the outer edge of the teeth of the gear 20, and the inner edge thereof located substantially adjacent the radial center of the edges of the pockets 58 formed on the face of the gear 20, again considering the outward thrust of the oil due to centrifugal force. As illustrated in FIGURE 3, the outermost edge of the trough 62 is radially adjacent the outer edge of the teeth of the gear 20. This is because tests indicate that there is a tendency for the teeth to sling some oil to the side, toward the trough 62, as well as forward and upward. Oil in the pockets 58 is free to drop into the trough 62 after traversing the close clearance area between the lowermost edges of the troughs 60 and 62. The trough 62 enlarges at the upper end thereof, with a branch thereof extending radially inwardly toward the axis of the bearing 17. It may be noted that any oil which may still remain in the pockets 58 is now free to fall over the lower inwardly extending edge 63 of the trough 62.

A ridge 64 is formed on the wall 18 along a lower edge 66 of the inlet trough 60, sloping downwardly thereon and terminating at a point adjacent the outer periphery of the first speed output gear 20. A second ridge or lobe 68 is formed on the wall 18 adjacent an upper edge 70 of the outlet trough 62.

Figure 4:
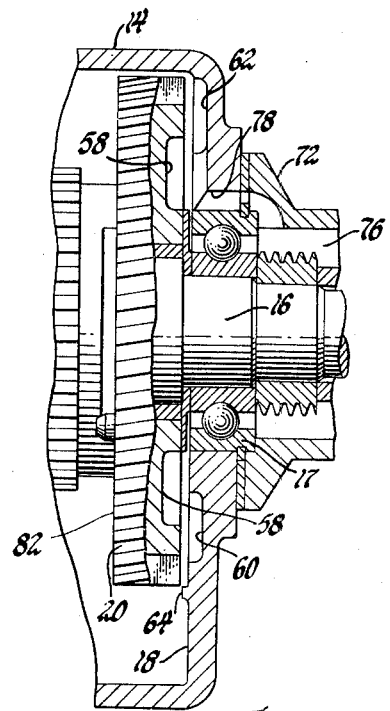
FIGURE 4 is a cross-sectional view taken along the plane of line 4—4 of FIGURE 3, and looking in the direction of the arrows.
Figure 5:
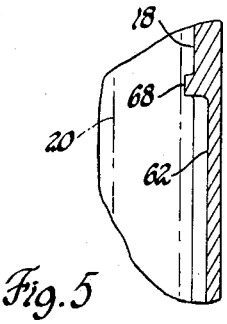
FIGURE 5 is a cross-sectional view taken along the plane of line 5—5 of FIGURE 3, and looking in the direction of the arrows.

A rear cover plate 72 (FIGURES 1 and 4) is secured to the gearbox casing 14, around the output shaft 16, by any suitable means, such as bolts 74. The rear cover plate 72 has a cavity 76 formed therein adjacent the bearing 17. A passage 78 (FIGURE 4) is formed through the wall 18 of the casing 14 exterior the bearing 17 and through a portion of the rear cover plate 72, communicating between the radially inwardly extending portion of the outlet trough 62.

Insofar as the overall operation of the inventive lubricating means is concerned, oil, which is picked up by the various gears from the reservoir 25 within the casing 14, is splashed against the walls and top of the casing 14 in the usual manner, the static oil level condition being substantially as represented by the line A in FIGURE 1. As the splashed oil flows down the wall 18 by gravity, it either flows directly into the upper wider portion of the inlet trough 60 (FIGURE 3) or is steered toward the trough 60 by the ridge 64. This oil is picked up from the trough 60 by the fins 56 (FIGURE 2) during the rotation of the first speed output gear 20 and transported in the pocket 58 in a clockwise direction (FIGURE 3), being retained therein by the closely adjacent wall 18, toward the outlet trough 62 and is deposited therein with an upward force. The lobe 68 adjacent the upper edge 70 of the trough 62 helps to retain the oil in the trough 62 and to direct it toward the outlet passage 78 between the edges 63 and 70. As a result of the pumping action, the oil then flows via the passage 78 into the rear bearing cavity 76, thereby providing lubrication for the bearing 17 remotely located in a wall of the casing 14, rather than in the interior of the casing.

Figure 6:
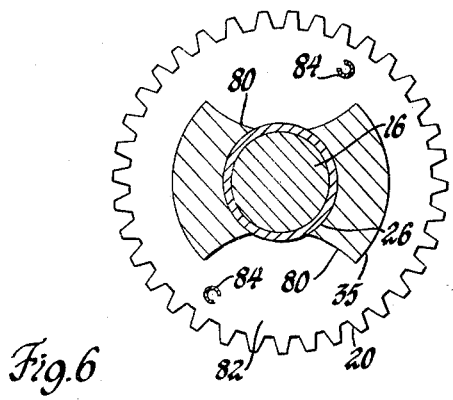
FIGURE 6 is a fragmentary cross-sectional view taken along the plane of line 6—6 of FIGURE 1, and looking in the direction of the arrows.

An additional lubrication feature, illustrated in FIGURES 1 and 6, includes one or more slots 80 milled in the first speed gearwheel collar 35 immediately adjacent the face 82 of the gear 20. Each slot 80 exposes a portion of the central bearing 26. A pin 84 is mounted in the face 82 over each milled slot 80. The pin 84 may be a standard sheet metal rolled pin and is preferably located just behind a radius (FIGURE 6) passing through the innermost portion of the leading edge of each slot 80. The radial location of the split portion of the rolled pin is inconsequential.

As the pins 84 are rotated by the gear 20, they are splashed with oil from other rotating gears. The pins 84, in turn, throw or divert said oil radially inwardly into their respective slots 80, thereby providing lubrication for the central bearing 26 on which the first speed gear 20 is mounted. This supplements the droplets of oil which fall directly from the top wall of the housing 14 into the milled slots 80.

It should be apparent that the invention provides a novel inherent pumping means for lubricating a remotely positioned bearing which rotatably supports the output shaft, as well as for lubricating the central bearing associated with a speed output gear, without requiring the use of an additional pump structure, such as a rotary pump.

It should also be apparent that, while the novel lubricating means has been described relative to a sliding mesh transmission gear arrangement, the lubricating means could be incorporated in any gearing assembly, particularly wherein a bearing is mounted in a wall of or outside an oil reservoir housing, and a gear rotates in the oil of the reservoir close to a side wall thereof.

While but one embodiment of the invention is shown and described, other modifications thereof are possible.

We claim:

1. In a transmission having a rotatable shaft, gear means rotatably mounted on said shaft, said gear means including a bearing on said shaft and a gear and hub mounted on said bearing, and means for lubricating said bearing, said means including a source of lubricating fluid in said transmission, a slot formed radially through said hub, the outer opening of said slot being wider than the inner opening thereof and suitable for receiving splashed oil which falls from the top wall of said transmission, and a pin mounted on the face of said gear radially aligned with a portion of the leading edge of said slot, said pin being splashed with droplets of said fluid picked up by said gear means and throwing said droplets radially inwardly into said slot for supplementing the splashed lubrication of said bearing.

2. The combination described in claim 1, wherein said slot is a milled slot.

3. The combination described in claim 1, wherein said pin is located just behind a radius passing through the leading edge of said slot.

References Cited

UNITED STATES PATENTS

| | | | |
|---|---|---|---|
| 2,489,699 | 11/1949 | Clark | 184—11 |
| 2,518,837 | 8/1950 | Taylor | 184—11 |
| 2,523,764 | 9/1950 | Jodry | 184—11 |
| 2,591,127 | 4/1952 | Brewster | 184—11 XR |
| 2,602,522 | 7/1952 | Roos | 184—11 |
| 2,708,985 | 5/1955 | Evans et al. | 184—11 |

FRED C. MATTERN, Jr., Primary Examiner

M. A. ANTONAKAS, Assistant Examiner

U.S. Cl X.R.

74—467